United States Patent [19]
Sawyer et al.

[11] Patent Number: 6,058,115
[45] Date of Patent: May 2, 2000

[54] COMMUNICATION METHOD AND APPARATUS UTILIZING PROTOCOL OPTIONS

[75] Inventors: Steven Paul Sawyer, Fountain Hills; Johanna Alexandra Wild, Scottsdale; Peter Joseph Armbruster, Chandler, all of Ariz.

[73] Assignee: Motorola, Inc., Schaumburg, Ill.

[21] Appl. No.: 08/905,666

[22] Filed: Aug. 4, 1997

[51] Int. Cl.⁷ .............................. H04L 12/56; H04J 3/16
[52] U.S. Cl. ........................ 370/401; 370/466; 709/230
[58] Field of Search ................................ 455/427, 428, 455/430, 445, 560, 561; 370/616, 323, 325, 401, 402, 410, 427, 428, 429, 430, 465, 466, 467; 375/222; 709/230, 237, 238; 701/15

[56] References Cited

U.S. PATENT DOCUMENTS

| | | | |
|---|---|---|---|
| 5,568,525 | 10/1996 | De Nijs et al. | 370/467 |
| 5,586,117 | 12/1996 | Edem et al. | 470/466 |
| 5,742,602 | 4/1998 | Bennett | 370/401 |
| 5,754,552 | 5/1998 | Allmond et al. | 370/410 |
| 5,943,481 | 8/1999 | Wakeland | 370/466 |
| 5,953,340 | 9/1999 | Scott et al. | 370/465 |

FOREIGN PATENT DOCUMENTS

| | | | |
|---|---|---|---|
| 0742662 | 5/1995 | European Pat. Off. | H04L 29/06 |
| 0748064 | 6/1995 | European Pat. Off. | H04B 7/185 |
| 2292653 | 7/1995 | United Kingdom . | |
| 2323246 | 9/1998 | United Kingdom | H04L 29/06 |
| 9219050 | 10/1992 | WIPO | H04B 7/185 |
| 9835526 | 2/1997 | WIPO | H04Q 11/00 |
| 9800986 | 1/1998 | WIPO | H04Q 7/20 |
| 9802011 | 1/1998 | WIPO | G04Q 7/38 |

*Primary Examiner*—Alpus H. Hsu
*Assistant Examiner*—Afsar M. Qureshi
*Attorney, Agent, or Firm*—Sherry J. Whitney; James E. Klekotka

[57] ABSTRACT

Originating and terminating units (32, 36) communicate through a network (22) containing satellites (46, 50, 52) and gateways (44, 48). The network (22) receives user-prioritized lists (62) of protocols from the respective units (32, 36). The network (22) compares the lists (62) to determine the highest-priority common protocol. If a common protocol exists, the network (22) establishes a link between the units (32, 36) utilizing the common protocol and excluding the gateways (44, 48). If a common protocol does not exist, the network (22) selects as originating and terminating protocols the highest-priority protocols in the respective lists (62). If the originating protocol consumes a greater number of resources, the network (22) establishes the link, translating between protocols in an originating gateway (44) and excluding a terminating gateway (48). Otherwise, the network (22) establishes the link, translating in the terminating gateway (48) and excluding the originating gateway (44).

19 Claims, 8 Drawing Sheets

FIG. 15 ated with higher cost. The least-expensive and the highest-quality protocols are not likely to be the same protocol. Therefore, provisions need be made to alter the protocol priority according to the requirements of the subscriber. This is not feasible with conventional communication networks.

COMMUNICATION METHOD AND APPARATUS UTILIZING PROTOCOL OPTIONS

FIELD OF THE INVENTION

The current invention relates to communication networks. Specifically, the current invention relates to communication networks utilizing originating and terminating communication protocols.

BACKGROUND OF THE INVENTION

Conventional communication networks, especially satellite-base communication networks, suffer from an inefficient use of system resources. Inefficiencies may result from the establishment and maintenance of a communication link between subscriber units utilizing differing communication protocols, the assignment of protocol priorities when multiple protocols are possible over a communication link between a given pair of subscriber units, and the utilization of system resources not specifically required by a given communication link between subscriber units.

The establishment and maintenance of a communication link between subscriber units utilizing differing communication protocols are typically possible only in limited cases, such as between a hand-held subscriber unit, e.g., a cellular phone, and a common PSTN (public switched telephone network) unit (e.g., a standard telephone in a local land-based telephone network). However, two dissimilar subscriber units, each capable of communicating with a PSTN telephone via the communication network, may be unable to communicate with each other should their protocols differ. Any attempt to complete such a connection would result in the call being dropped. Dropping the call often results in poor customer satisfaction and a loss of revenue.

Should multiple communication protocols be possible over a communication link between a given pair of subscriber units (i.e., each subscriber unit and the network itself may communicate via any one of a multiplicity of common communication protocols), then a method of prioritizing those protocols is desirable. A problem arises as to how and where in the system protocol prioritization is to be performed. The priorities of the provider and the priorities of the subscriber often conflict. For example, the ideal protocol for the provider may be one that optimizes the use of system resources, (e.g., places the least burden upon the network and/or incurs the lowest system overhead cost). For the subscriber, on the other hand, the ideal protocol may be one that minimizes subscriber costs (not the same as minimizing provider costs), or maximizes quality. Under such conditions, a problem arises in determining the appropriate protocol to be used.

Related to the problem of protocol prioritization discussed above is the problem of changing that prioritization in accordance with the requirements of the subscriber. For example, in a first call, a subscriber may simply be interested in a routine voice transmission and opt for the least-expensive voice protocol available for the call. Conversely, in a second call, the same subscriber may desire a highest-quality voice protocol, even though such a protocol may be associated with higher cost. The least-expensive and the highest-quality protocols are not likely to be the same protocol. Therefore, provisions need be made to alter the protocol priority according to the requirements of the subscriber. This is not feasible with conventional communication networks.

Also, in the majority of conventional communication networks, once resources have been allocated to a given communication link between two subscriber units, those resources remain allocated until the call is complete and the link is severed. This occurs in spite of the fact that the resources required to initiate the communication link are not necessarily the resources required to maintain the link. In those conventional communication networks that do provide for resource reallocation, no consideration is given to the preservation of those resources allocated to the translation and/or prioritization of protocols. The reallocation of resources using conventional reallocation techniques in a communication network enhanced to provide protocol translation and/or prioritization would therefore result in the dropping of calls.

What is needed, therefore, is an apparatus and methodology with which a communication network may establish and maintain a communication link between two subscriber units having potentially differing communication protocols and translating those protocols as required without dropping any such links.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE DRAWINGS

Figure 1:
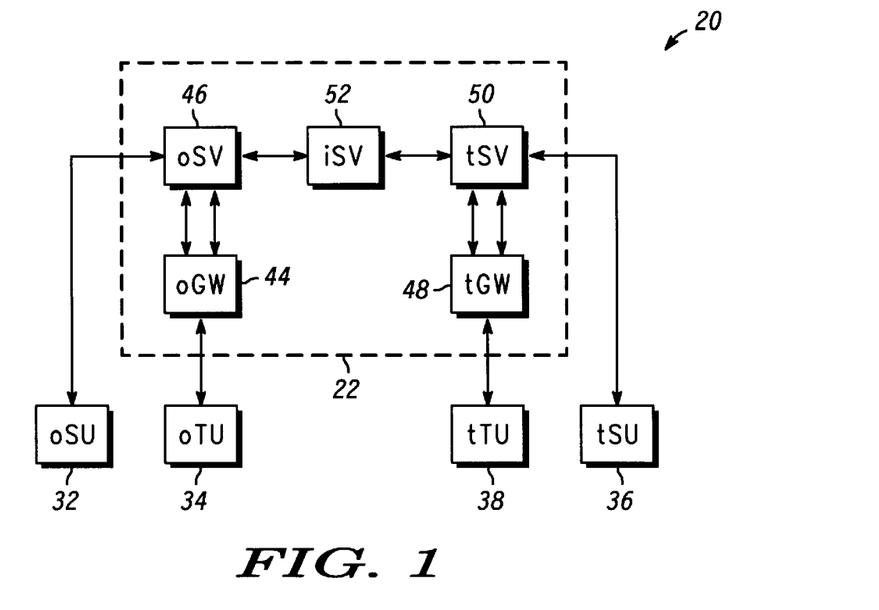
FIG. 1 shows a simplified block diagram of a communication system in accordance with a preferred embodiment of the present invention.

FIG. 1 shows a simplified block diagram of a communication system 20 in accordance with a preferred embodiment of the present invention. Communication system 20 contains a communication network 22, originating units 32, 34, and terminating units 36, 38. Originating units 32, 34 and terminating units 36, 38 may be either subscriber units (e.g., cellular telephones) 32, 36 or public switched telephone network (PSTN) units 34, 38. In the preferred embodiment, communication is established between an originating subscriber unit (oSU) 32 or an originating PSTN unit (oTU) 34 and a terminating subscriber unit (tSU) 36 or a terminating PSTN unit (tTU) 38 through communication network 22.

Communication network 22 is, in the preferred embodiment, a global satellite-based communication network. However, those skilled in the art will recognize that other communication networks may be utilized without departing from the spirit of the current invention. In the preferred embodiment, communication network 22 contains a multiplicity of ground-based gateways 44, 48 (GW) and space vehicles or satellites 46, 50, 52 (SV). A gateway 44, 48 provides an interface between satellites 46, 50, 52 and a local PSTN (not shown), and provides a locus for subscriber unit 32, 36 and PSTN unit 34, 38 communication. In other words, all originating units 32, 34 and/or terminating units 36, 38 interface directly or indirectly with communication network 22 through gateways 44, 48. Hence, originating subscriber unit 32 communicates with an originating gateway 44 (oGW) through an originating satellite 46 (oSV) and terminating subscriber unit 36 communicates with a terminating gateway 48 (tGW) via a terminating satellite 50 (tSV). Conversely, originating PSTN unit 34 communicates with originating gateway 44 through an originating local PSTN (not shown) and terminating PSTN unit 38 communicates with terminating gateway 48 through a terminating local PSTN (not shown).

Originating gateway 44 communicates with terminating gateway 48 through originating satellite 46, an intermediate satellite 52 (iSV), and terminating satellite 50. Intermediate satellite 52, as shown in FIG. 1, is representative of any number of intermediate satellites 52, including no intermediate satellites 52, between originating satellite 46 and terminating satellite 50 in a given communication path.

Figure 2:
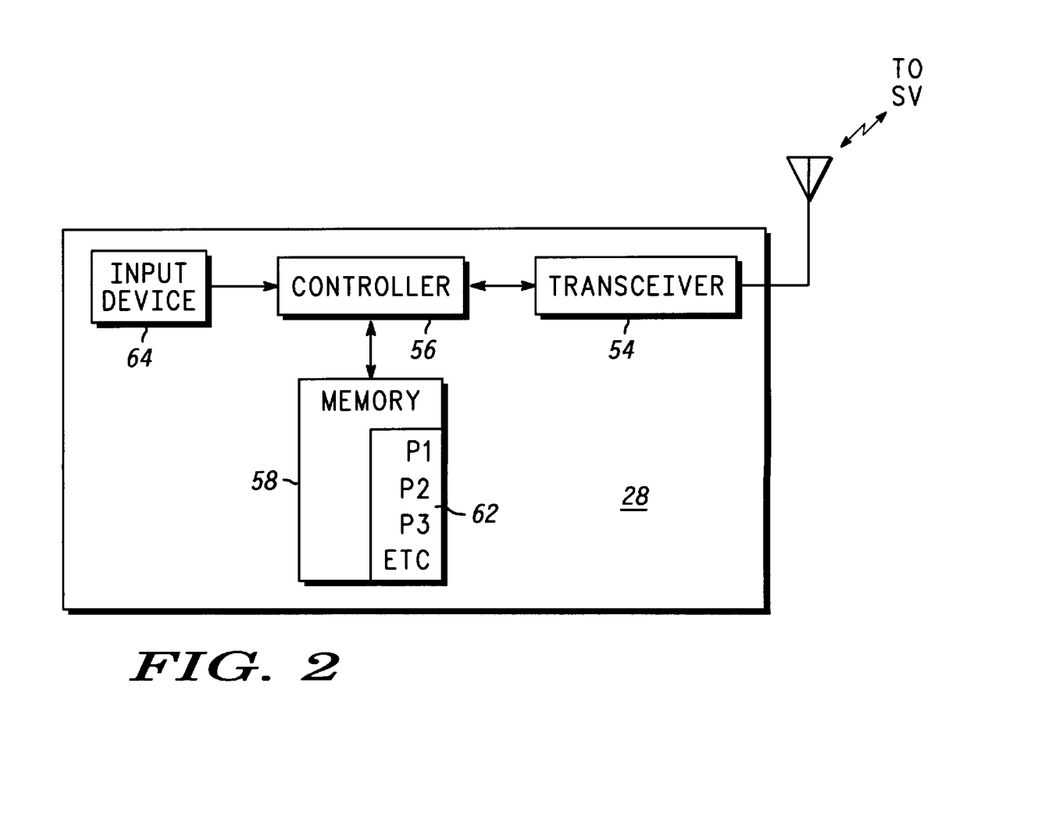
FIG. 2 shows a simplified block diagram of a subscriber unit in accordance with a preferred embodiment of the present invention.

FIG. 2 shows a simplified block diagram of subscriber unit 28 for use with communication network 22 in accordance with a preferred embodiment of the present invention. In the preferred embodiment, each subscriber unit 28 communicates with communication network 22 through a satellite. That is, each subscriber unit 28 is radio-linked with a satellite and must interface with a gateway through the satellite. This is accomplished via a transceiver 54 within subscriber unit 28. Transceiver 54 is controlled by a controller 56. Controller 56 is coupled with a memory 58 containing at least one protocol with which subscriber unit 28 may communicate with communication network 22.

Subscriber unit 28, however, may be capable of communicating using any of a multiplicity of protocols. In a preferred embodiment, these protocols are contained in a prioritized protocol list 62 contained within memory 58. Controller 56 desirably updates and maintains the prioritization of protocol list 62 through the use of an input device 64 which is under user control. Input device 62 need be nothing more than a standard keypad of subscriber unit 28. Of course, subscriber unit 28 may contain many additional blocks, functions, and components which are omitted from FIG. 2 for the sake of clarity.

Subscriber unit 28 as shown in FIG. 2 is exemplary of both originating subscriber unit 32 (FIG. 1) and terminating subscriber unit 36 in the preferred embodiment. Protocol list 62, when originating subscriber unit 32 is exemplified, represents an originating protocol list (oPL), and when terminating subscriber unit 36 is exemplified, represents a terminating protocol list (tPL).

Those skilled in the art will realize that protocol list 62 may be kept in another element of communication system 20 without deviating from the purpose and intent of the present invention.

Figure 3:
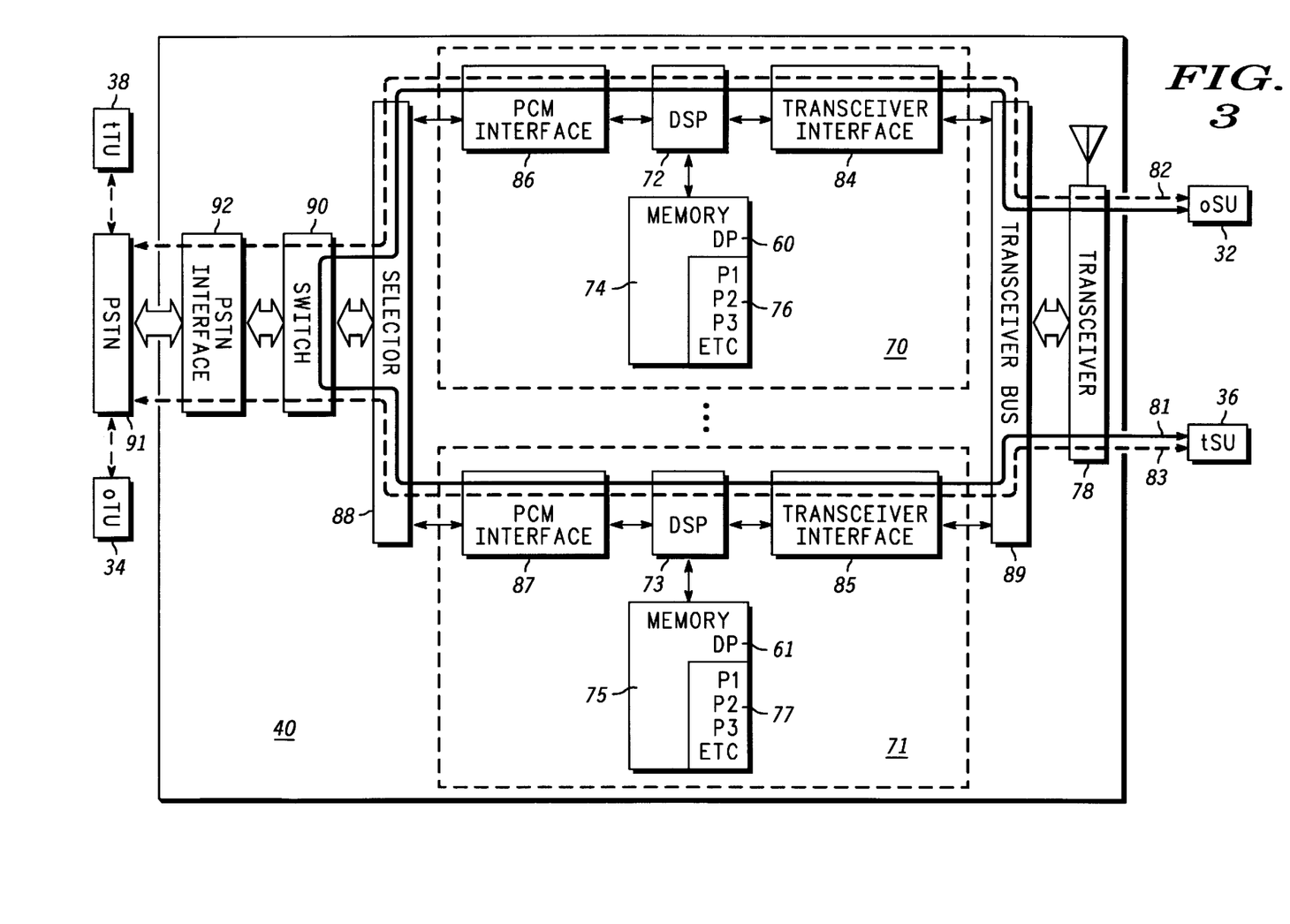
FIG. 3 shows a simplified block diagram of a gateway for use in a communication network in accordance with a preferred embodiment of the present invention.

FIG. 3 shows a simplified block diagram of gateway 40 for use in communication network 22 in accordance with a preferred embodiment of the present invention. In the preferred embodiment, gateway 40 has two functions for the purposes of the present invention. These two functions include that of an interface between communication network 22 and the local PSTN, and that of a translator between communication protocols. Gateway 40 contains any number of transcoders 70, 71, although FIG. 3 shows only two of such transcoders 70, 71 for the sake of clarity. Each transcoder 70, 71 includes a digital signal processor (DSP) or controller 72, 73, a transceiver interface 84, 85, a pulse code modulated (PCM) interface 86, 87, and a memory device 74, 75.

Referring to transcoder 70, DSP 72 translates between PCM protocol (i.e., a default protocol of the PSTN), and any one of the protocols 60, 76 whose parameters are stored in a transcoder memory 74 coupled to DSP 72, one of which is a default protocol 60 (to be discussed later).

A task of any given transcoder 70, 71 is to provide a bi-directional translating interface between a system protocol (i.e., a protocol used within communication system 20), and the PCM protocol used by the local PSTN. Transcoders 70, 71 may each be capable of translating a number of communication protocols. Any given transcoder 70, 71, however, may only translate those communication protocols whose parameters are stored in transcoder memory 74, 75 as a protocol list 76, 77. For example, list 76 may be realized as a series of different computer software "modules," wherein each module would cause DSP 72, 73 to perform a translation of a different communication protocol. The selection of the proper module, in this example, would provide the needed translation to meet the requirements of communication system 20. Protocol list 76, 77 may or may not be sorted or prioritized.

Since communication system 20 may be capable of communication utilizing a greater number of communication protocols than would be practical for a single given transcoder 70, 71, gateway 40 may contain a number of transcoders 70, 71 with differing protocol lists 76, 77. Any given transcoder 70, 71 would be capable of translating those protocols contained within its protocol list 76, 77.

FIG. 3 depicts communication-link paths 81–83 between originating and terminating units. Depicted are a communication path 81 between originating subscriber unit 32 and terminating subscriber unit 35, a path 82 between originating subscriber unit 32 and terminating PSTN unit 38, and a path 83 between originating PSTN unit 34 and terminating subscriber unit 36. Progressions of a signals along these paths are outlined below.

A signal originating from originating subscriber unit 32 and destined for terminating subscriber unit 36 travels along path 81. Originating subscriber unit 32 generates a signal which it sends to gateway 40 via a satellite. Gateway 40 has a transceiver 78 with which to receive the signal from the satellite. Once received by transceiver 78, the signal passes through a transceiver bus 89 and enters transcoder 70 via a transceiver interface 84.

DSP 72 then translates the signal from an originating communication protocol to PCM protocol (i.e., the default protocol for PSTN systems). The signal, having been translated, then exits transcoder 70 via PCM interface 86 and enters selector 88. Selector 88 is essentially a switching system which routes the signal through transcoders 70, 71. From selector 88 the signal passes to a routing switch 90. Routing switch 90 determines the routing of the signal which, for the purposes of this example, is to terminating subscriber unit 36 via path 81.

Routing switch 90 routes the signal back to selector 88, where it passes through another transcoder 71 and is translated into a terminating communication protocol. The signal then passes through transceiver bus 89 into transceiver 78, and is transmitted to a satellite and ultimately to terminating subscriber unit 36. Desirably, path 81 is bi-directional, and signals from terminating subscriber unit 36 to originating subscriber unit 32 could follow the reverse of the above-described path 81.

In an alternate embodiment, translation to a PCM protocol could be bypassed, and the signal could be translated directly from the originating subscriber unit protocol to the terminating subscriber unit protocol. Where the originating and terminating units shared the same protocol, no translation would be necessary.

If communication is to occur between originating subscriber unit 32 and terminating PSTN unit 38, as indicated by path 82, then the signal follows the same path as just described, up until the point that the signal reaches routing switch 90. At this point, routing switch 90 passes the signal through PSTN interface 92, through the local PSTN 91, and to terminating PSTN unit 38. Desirably, path 82 is bi-directional, and signals from terminating PSTN unit 38 to originating subscriber unit 32 follow the reverse of the above-described path 82.

Signals between originating PSTN unit 34 and terminating subscriber unit 36 would follow path 83. The routing of these signals along path 83 can be understood by referring to FIG. 3 and the above description of signal routing along paths 81 and 82.

In alternate embodiments, some or all of paths 81–83 could be unidirectional. For example, a unidirectional path could be established when one-way data (e.g., a page or fax) is to be delivered to the terminating unit.

The status of routing switch 90 and selector 88 is controlled by a gateway controller (not shown) which provides supervisory control of the components of gateway 40. Those skilled in the art will recognize that there are alternative ways to implement gateway 40, and that those alternative implementations do not depart from the purpose and intent of the present invention.

As defined herein, an "interim communication path" is a communication path between an originating and terminating unit which exists temporarily during link setup. A "final communication path" is defined herein as the communication path between the originating and terminating unit once the link is established. For example, and interim communication path might include the originating unit, one or more gateways, one or more satellites, and the terminating unit. The final communication path may or may not include the gateways, depending on whether a common protocol exists.

The interim communication path and final communication path include one or more "node-to-node links." A node-to-node link connects two system devices (not including satellites). For example, an interim communication path might include three node-to-node links: originating unit to originating gateway; originating gateway to terminating gateway; and terminating gateway to terminating unit. These concepts will be discussed in more detail, below.

Figure 4:
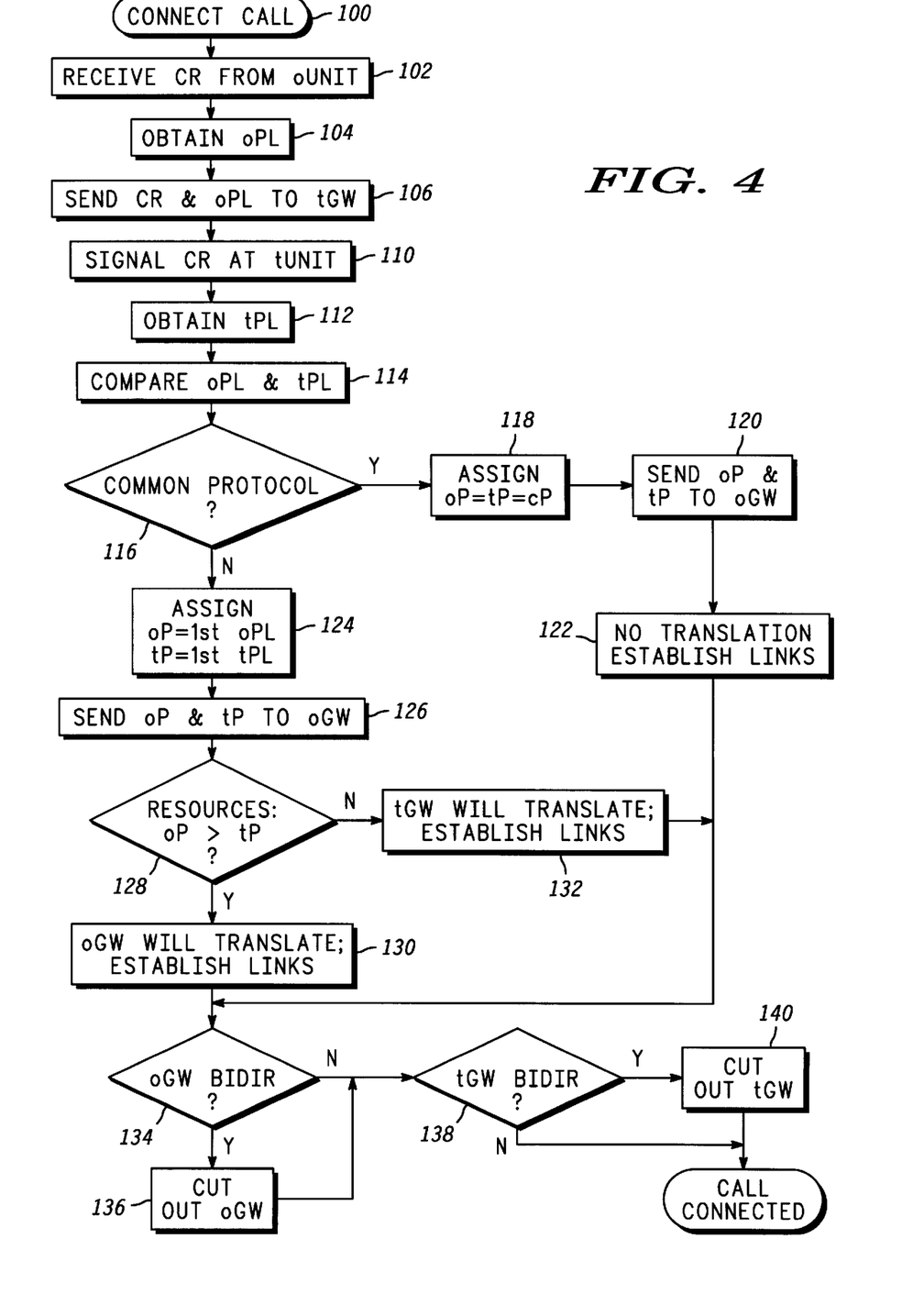
FIG. 4 shows a flowchart depicting a process for the establishment of a communications path in accordance with a preferred embodiment of the present invention.

FIG. 4 shows a flowchart depicting a process for the establishment of a communication link (i.e., connection of a call) in system 20 in accordance with a preferred embodiment of the present invention. The flowchart illustrates a process whereby a final communication path is established between an originating unit (oUNIT) and a terminating unit (tUNIT). For illustrative purposes, oUNIT may be either originating subscriber unit 32 (FIG. 1) or originating PSTN unit 34 and tUNIT may be either terminating subscriber unit 36 or terminating PSTN unit 38. Each of these variations are demonstrated in FIGS. 5 through 15 and will be discussed in turn.

Referring to FIG. 4, when a final communication path 152 is to be established between originating subscriber unit 32 and terminating subscriber unit 36, the connect call process begins with a task 102 wherein originating gateway 44 receives a call request (CR) from originating subscriber unit 32. This call request is initiated in originating subscriber unit 32 in a conventional manner, and is passed up to originating satellite 46, then down to originating gateway 44. Originating gateway 44 handshakes with originating subscriber unit 32 end the call request is received.

In a task 104, following task 102, originating gateway 44 receives originating protocol list. 62 (FIG. 2) from originating subscriber unit 32. In it preferred embodiment, originating protocol list 62 is transmitted by originating subscriber unit 32 and routed to originating gateway 44 during call setup. List 62 contains the desired communication protocols of originating subscriber unit 32 in priority order (e.g., most desired protocol first, next most desired protocol next, etc.). This priority order may be established by the user via input device 64 (FIG. 2) and controller 56 (FIG. 2).

In an alternate embodiment, originating gateway 44 could already have knowledge of an originating protocol list for the originating subscriber unit 32 stored in gateway memory 74. The originating protocol list could be static, or it could be re-configurable through commands from the originating subscriber unit 32 or another control source.

In a next task 106, originating gateway 44 passes the call request and originating protocol list 62 to terminating gateway 48 through originating satellite 46, any intermediate satellites 52, and terminating satellite 50.

In a task 110, terminating gateway 48 then connects with terminating subscriber unit 36. That is, terminating gateway 48 informs terminating subscriber unit 36, via terminating satellite 50, that a call request is present.

In a task 112, following task 110, terminating gateway 48 receives terminating protocol list 62 (FIG. 2) from terminating subscriber unit 36. In a preferred embodiment, terminating protocol list 62 is transmitted by terminating subscriber unit 36 and routed to terminating gateway 48 during call setup.

In a task 114, terminating gateway 48 compares the originating protocol list and terminating protocol list to determine a protocol common to both originating subscriber unit 32 and terminating subscriber unit 36.

A decision task 116 then determines if terminating gateway 48 has found a common protocol (cP) (i.e., a protocol that is contained in both the originating protocol list and terminating protocol list). In the preferred embodiment, originating subscriber unit 32 has priority over terminating subscriber unit 36. Therefore, in the event of multiple common protocols, that protocol that has a higher priority in originating protocol list 62 would be the common protocol. In alternate embodiments, terminating subscriber unit 36 could have priority or priority could be determined by the system.

When decision task 116 determines that a common protocol was found, terminating gateway 48, in a task 118, assigns both an originating protocol (oP) and a terminating protocol (tP) equal to the common protocol.

In a task 120, following task 118, terminating gateway 48 sends a message indicating the originating and terminating protocol assignments to originating gateway 44. Alternatively, terminating gateway 48 could send information identifying the common protocol and a message indicating that the protocols were common.

Figure 5:
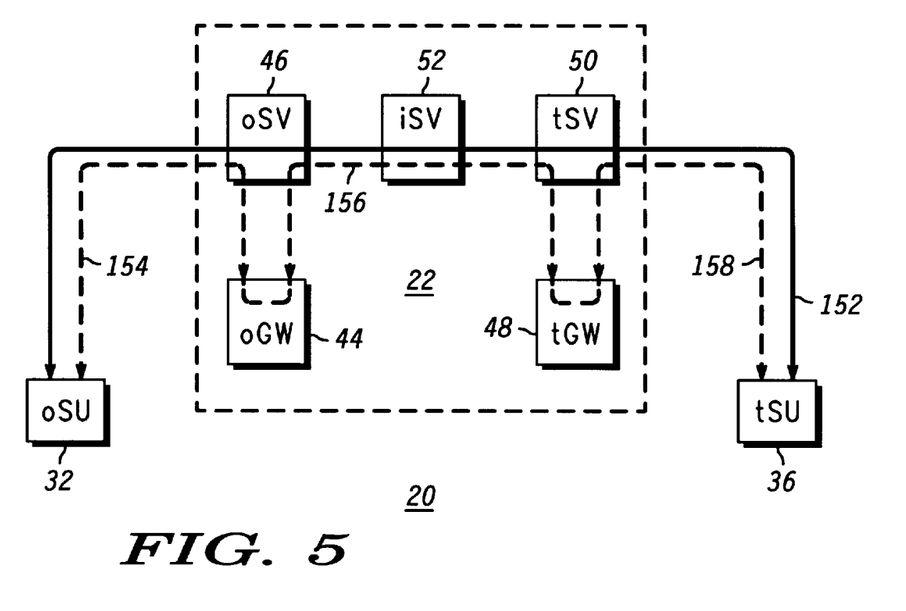
FIG. 5 shows a simplified block diagram demonstrating a communication path between subscriber units utilizing a common protocol in accordance with a preferred embodiment of the present invention.

Because the originating protocol and the terminating protocol are identical (i.e., the common protocol), originating gateway 44, in a task 122, allocates resources and establishes three node-to-node links spanning the distance between originating subscriber unit 32 and terminating subscriber unit 36. Referring also to FIG. 5 in order to illustrate the node-to-node links, node-to-node link 154, utilizing the common protocol, is established from originating subscriber unit 32, through originating satellite 46, to originating gateway 44. A node-to-node link 156, also utilizing the common protocol, is established from originating gateway 44, through originating satellite 46, intermediate satellite 52 and terminating satellite 50, to terminating gateway 48. A node-to-node link 158, again utilizing the common protocol, is established from terminating gateway 48, through terminating satellite 50, to terminating subscriber unit 36. All three node-to-node links 154, 156, 158 taken together make up an interim communication path.

Referring back to FIG. 4, when decision task 116 determines that a common protocol wax not found (i.e., no protocol in the originating protocol list matches a protocol in the terminating protocol list), terminating gateway 48, in a task 124, assigns tie first (e.g., highest-priority) protocol in the originating protocol list as an originating protocol and the first (e.g., highest-priority) protocol in the terminating protocol list as a terminating protocol.

In a task 126, terminating gateway 48 sends a message indicating the originating and terminating protocol assignments to originating gateway 44.

In a decision task 128, originating gateway 44 ascertains which of the originating and terminating protocols requires the greater number of system resources. In a preferred embodiment, this step is carried out in the interest of reducing system overhead by shifting a majority of the processing done by originating gateway 44 to either originating gateway 44 or terminating gateway 48.

If, in decision task 128, originating gateway 44 determines that the originating protocol requires the greater number of system resources, a task 130 allocates resources and initiates establishment of three node-to-node links 154, 156, 158 (FIG. 5) spanning the distance between originating subscriber unit 32 and terminating subscriber unit 36 with originating gateway 44 acting as the protocol translator. These node-to-node links 154, 156, 158 are similar to those described above, except that node-to-node link 154 utilizes the originating protocol, node-to-node link 156 utilizes the terminating protocol, and node-to-node link 158 also utilizes the terminating protocol.

Referring again to FIG. 4, if in decision task 128, originating gateway 44 determines that the originating protocol does not require the greater number of system resources, a task 132 allocates resources and initiates establishment of three node-to-node Links 154, 156, 158 spanning the distance between originating subscriber unit 32 and terminating subscriber unit 36 with terminating gateway 48 as the protocol translator. These node-to-node links 154, 156, 158 are similar to those described above, except that node-to-node link 154 utilizes the originating protocol, node-to-node link 156 utilizes the originating protocol, and node-to-node link 158 utilizes the terminating protocol.

Following tasks 122, 130, or 132, originating gateway 44, in a decision task 134, determines if originating gateway 44 has "common protocol bidirectionality." That is, a determination is made whether node-to-node link 154 (oSU to oGW) has the same protocol as node-to-node link 156 (oGW to tGW).

If, in decision task 134, originating gateway 44 determines that originating gateway 44 has common protocol bidirectionality, then originating gateway 44, in a task 136, instructs originating satellite 46 to cut out originating gateway 44. Originating satellite 46 effectively becomes a pass-through repeater, routing the signal from originating subscriber unit 32 directly to intermediate satellite 52 and/or terminating satellite 50 and vice-versa. This action excludes originating gateway 44 from interim communication path 154, 156, 158 and leaves it free for other tasks. By so doing, a reduction is made in transport delay with a corresponding improvement in signal quality while freeing communication resources within system 20.

If, in decision task 134, originating gateway 44 determines that originating gateway 44 does not have common protocol bidirectionality, then task 136 is bypassed and originating gateway 44 is not cut out.

Terminating gateway 44, in a decision task 138, then determines if terminating gateway 48 has common protocol bidirectionality. If so, then terminating gateway 48, in a task 140, instructs terminating satellite 50 to cut out terminating gateway 48. Terminating satellite 50 effectively becomes a pass-through repeater, routing the signal from originating satellite 46 and/or intermediate satellite 52 directly to terminating subscriber unit 36 and vice-versa.

If, in decision task 138, originating gateway 44 determines that terminating gateway 48 does not have common protocol bidirectionality, then task 140 is bypassed and terminating gateway 48 is not cut out.

At this point, the interim communication path has been modified by the cutting out of originating gateway 44 and/or terminating gateway 48, final (communication path 152 is established, and the call connection process is complete.

FIG. 4 illustrates a preferred method of link establishment and gateway cut out. Those of skill in the art will appreciate that the steps shown in FIG. 4 could be performed in different sequences or could be modified without departing from the scope of the present invention. In addition, in alternate embodiments, system devices other than, or in addition to, originating gateway 44 could perform many of the steps shown in FIG. 4.

Figure 6:
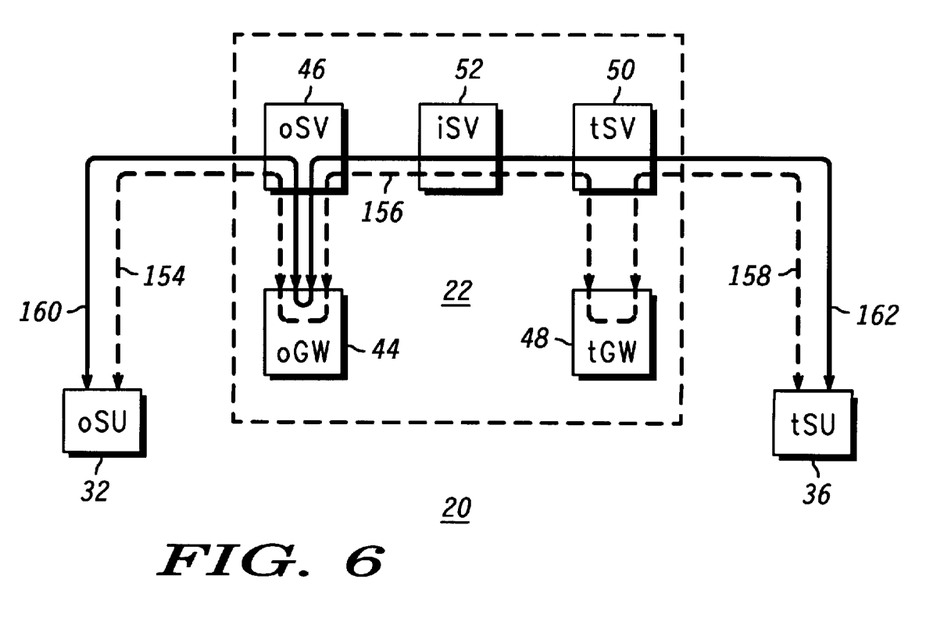
FIG. 6 shows a simplified block diagram demonstrating a communication path between subscriber units with translation performed in an originating gateway in accordance with a preferred embodiment of the present invention.
Figure 7:
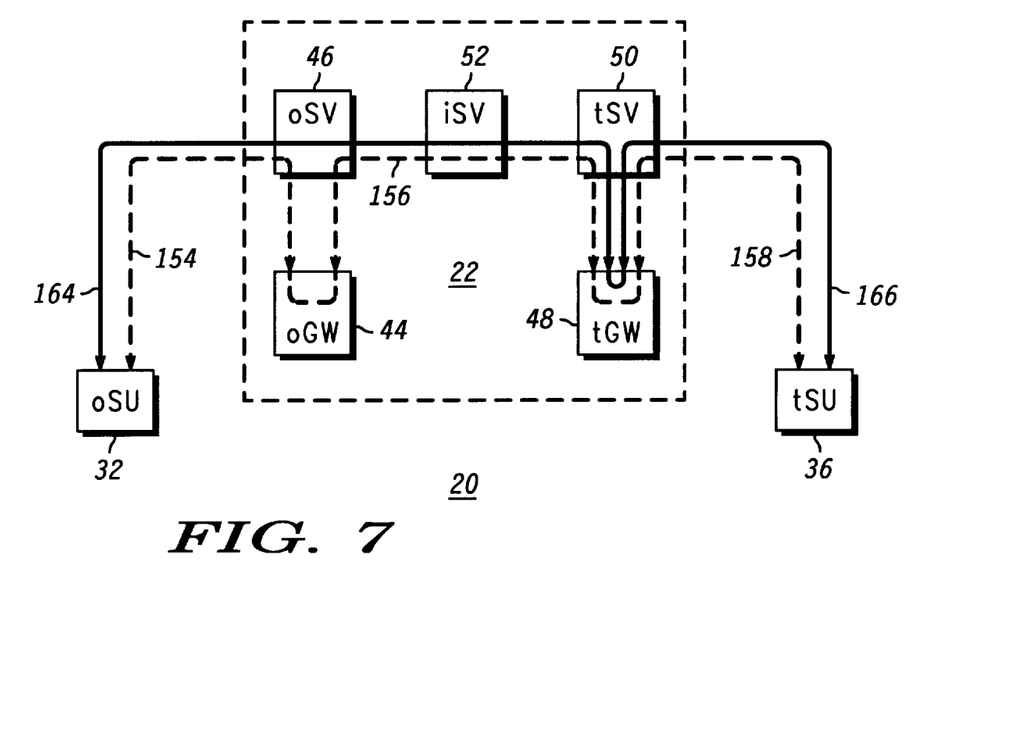
FIG. 7 shows a simplified block diagram demonstrating a communication path between subscriber units with translation performed in a terminating gateway in accordance with a preferred embodiment of the present invention.

FIGS. 5–7 show simplified block diagrams of interim communication paths and final communication paths between two subscriber units in accordance with preferred embodiments of the present invention. In a preferred embodiment, these paths would be established in accordance with the method of FIG. 4.

FIG. 5 demonstrates interim and final communication paths where the originating subscriber unit and the terminating subscriber unit utilize a common protocol. FIGS. 6 and 7 demonstrate interim and final communication paths without a common protocol, and with translation performed in either originating gateway 44 (FIG. 6) or terminating gateway 48 (FIG. 7).

If, as demonstrated in FIG. 5, originating gateway 44 found a common protocol, final communication path 152 contains a single link between originating subscriber unit 32 and terminating subscriber unit 36. This single link utilizes the common protocol from originating subscriber unit 32, through originating satellite 46, intermediate satellite 52, and terminating satellite 50, to terminating subscriber unit 36. Both originating gateway 44 and terminating gateway 48 have been cut out and freed for other uses.

If, as demonstrated in FIG. 6, originating gateway 44 did not find a common protocol and protocol translation is performed in originating gateway 44, the final communication path contains two links 160, 162 between originating subscriber unit 32 and terminating subscriber unit 36. A final originating link 160 utilizes the originating protocol from originating subscriber unit 32, through originating satellite 46, to originating gateway 44. A final terminating link 162 utilizes the terminating protocol from originating gateway 44, through originating satellite 46, intermediate satellite 52, and terminating satellite 50, to terminating subscriber unit 36. Terminating gateway 48 has been cut out and freed for other uses.

If, as demonstrated in FIG. 7, originating gateway 44 did not find a common protocol and protocol translation is performed in terminating gateway 48, the final communication path contains two links 164, 166 between originating subscriber unit 32 and terminating subscriber unit 36. A final originating link 164 utilizes the originating protocol from originating subscriber unit 32, through originating satellite 46, intermediate satellite 52, and terminating satellite 50, to terminating gateway 48. A final terminating link 166 utilizes the terminating protocol from terminating gateway 48, through terminating satellite 50, to terminating subscriber unit 36. Originating gateway 44 has been cut out and freed for other uses.

Where the originating and terminating units are not both subscriber units, variations of the method of FIG. 4 are desirably used to set up the final communication path. A number of these variations are described in conjunction with FIGS. 8–10.

Figure 8:
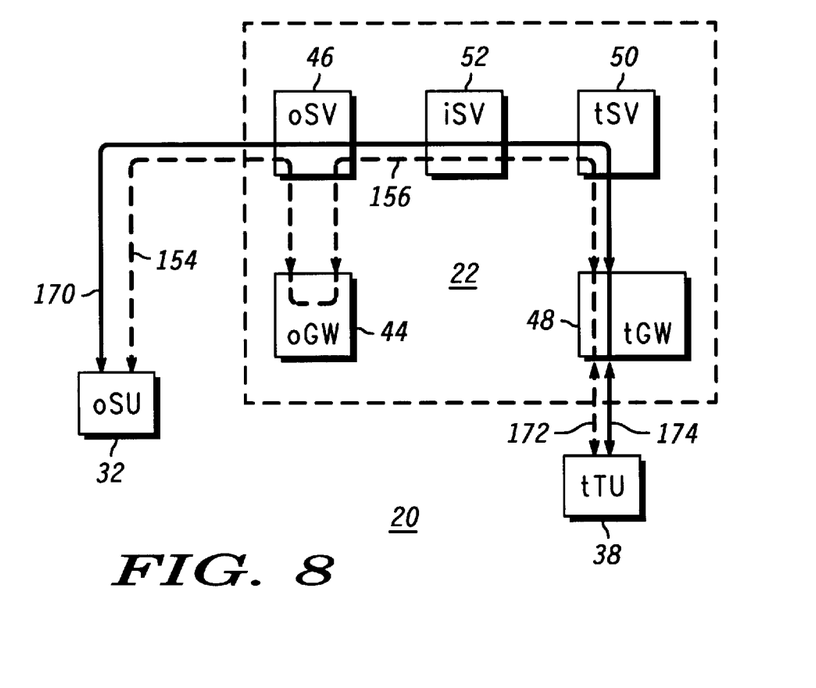
FIG. 8 shows a simplified block diagram demonstrating a communication path between an originating subscriber unit and a terminating PSTN unit in accordance with a preferred embodiment of the present invention.
Figure 9:
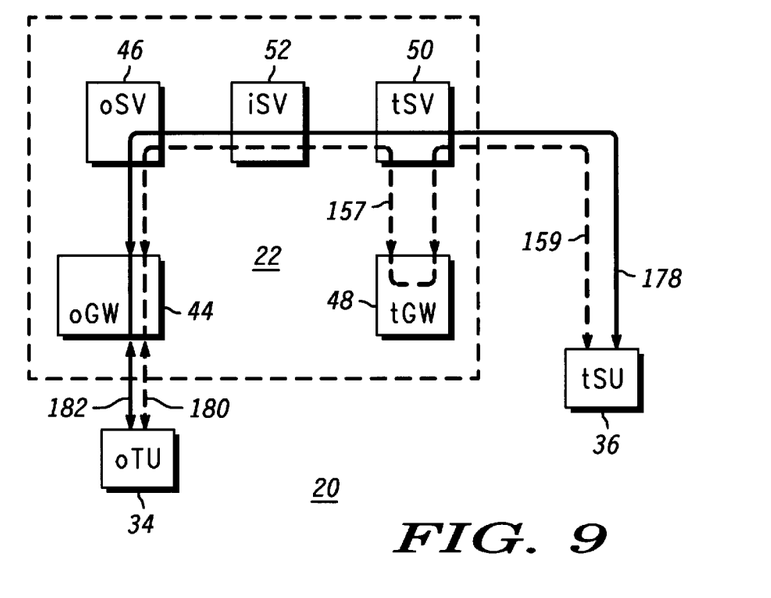
FIG. 9 shows a simplified block diagram demonstrating a communication path between an originating PSTN unit and a terminating subscriber unit in accordance with a preferred embodiment of the present invention.

FIGS. 8–9 show simplified block diagrams of interim communication paths and final communication paths between a subscriber unit and a PSTN unit in accordance with preferred embodiments of the present invention. In general, the protocol used by the subscriber unit and the PSTN unit will differ, because it is assumed that the PSTN unit uses a protocol such as a PCM protocol.

FIG. 8 shows a simplified block diagram of communication system 20 demonstrating an interim communication path 154, 156 and a final communication path 170 between originating subscriber unit 32 and terminating PSTN unit 38 in accordance with a preferred embodiment of the present invention.

Interim communication path 154, 156 and final communication path 170 are established using the method of FIG. 4, except that, because the terminating unit is a terminating PSTN unit 38, tasks 112, 114, 116, 118, 120, 122, 124, 126, 128, 130, 134, 138, and 140 are bypassed.

In task 132, originating gateway 44 allocates resources and establishes three node-to-node links spanning the distance between originating subscriber unit 32 and terminating PSTN unit 38 with terminating gateway 48 as the protocol translator. Originating node-to-node link 154, utilizing the originating protocol, is established from originating subscriber unit 32, through originating satellite 46, to originating gateway 44. Inter-gateway node-to-node link 156, also utilizing the originating protocol, is established from originating gateway 44, through originating satellite 46, intermediate satellite 52, and terminating satellite 50, to terminating gateway 48. A terminating node-to-node link 172, utilizing the PCM protocol, is established from terminating gateway 48 to the local PSTN (not shown), which is connected to terminating PSTN unit 38. All threes node-to-node links taken together make up the interim communication path.

Since terminating gateway 48 is the protocol translator, originating gateway 44 has common protocol bidirectionality. Originating processor 96, in task 136, instructs originating satellite 46 to cut out originating gateway 44. At this point, interim communication path 154, 156 has been modified by the cutting out of originating gateway 44, final communication path 170 is established, and the process is complete. A final terminating link 174, utilizing the PCM protocol, is established from terminating gateway 48, to the local PSTN (not shown), which is connected to terminating PSTN unit 33. Originating gateway 44 has been cut out and freed for other uses.

FIG. 9 shows a simplified block diagram of communication system 20 demonstrating an interim communication path 157, 159 and a final communication path 178 between originating PSTN unit 34 and terminating subscriber unit 36 in accordance with a preferred embodiment of the present invention.

Interim communication path 157, 159 and final communication path 178 are established using the method of FIG. 4, except that, because the terminating unit is a terminating PSTN unit 34, tasks 104, 106, 114, 116, 118, 120, 122, 124, 126, 128, 132, 134, 136, and 138 are bypassed.

In task 130, originating gateway 44 allocates resources and establishes three node-to-node links spanning the distance between originating PSTN unit 34 and terminating subscriber unit 36 with terminating gateway 48 as the protocol translator. Originating PSTN unit 34 is connected to the originating local PSTN (not shown), which is linked to originating gateway 44 via an originating node-to-node link 180 utilizing the PCM protocol. Inter-gateway node-to-node link 157, utilizing the terminating protocol, is established from originating gateway 44, through originating satellite 46, intermediate satellite 52, and terminating satellite 50, to terminating gateway 48. Terminating node-to-node link 159, also utilizing the terminating protocol, is established from terminating gateway 48, through terminating satellite 50, to terminating subscriber unit 36. All three node-to-node links taken together make up the interim communication path.

Since originating gateway 44 is tie protocol translator, terminating gateway 48 has common protocol bidirectionality. Terminating processor 96, in task 140, instructs terminating satellite 50 to cut out terminating gateway 48. At this point in the process, interim communication path 157, 159 has been modified by the cutting out of terminating gateway 48, final communication path 178 is established, and the process is complete.

Originating PSTN unit 34 is connected to the originating local PSTN (not shown), which is linked to originating gateway 44 via a final originating link 182 utilizing the PCM protocol. Terminating gateway 48 has been cut out and freed for other uses.

Figure 10:
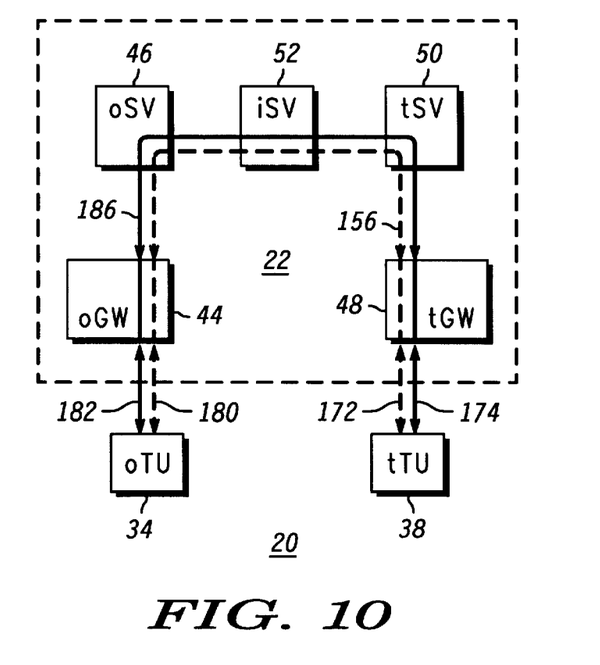
FIG. 10 shows a simplified block diagram demonstrating a communication path between PSTN units in accordance with a preferred embodiment of the present invention.

FIG. 10 shows a simplified block diagram of communication system 20 demonstrating an interim communication path 156 and a final communication path 186 between two PSTN units 34, 38 in accordance with a preferred embodiment of the present invention.

Interim communication path 156 and final communication path 186 are established using the method of FIG. 4, except that, because the originating unit is an originating PSTN unit 34, and the terminating unit is a terminating PSTN unit 38, tasks 104, 106, 112, 114, 116, 118, 120, 122, 124, 126, 128, 132, 134, 136, 138, and 140 are bypassed.

In task 130, originating gateway 44 allocates resources and establishes three node-to-node links spanning the distance between originating PSTN unit 34 and terminating PSTN unit 38 with both originating gateway 44 and terminating gateway 48 as the protocol translators. Originating PSTN unit 34 is connected to the originating local PSTN (not shown), which is linked to originating gateway 44 via originating node-to-node link 180 utilizing the PCM protocol. Since there is neither an assigned originating protocol nor an assigned terminating protocol, inter-gateway node-to-node link 156, utilizing default protocol 60, is established from originating gateway 44, through originating satellite 46, intermediate satellite 52, and terminating satellite 50, to terminating gateway 48. Terminating node-to-node link 172, utilizing the PCM protocol, is established from terminating gateway 48 to the terminating local PSTN (not shown), which is connected to terminating PSTN unit 38. All three node-to-node links taken together make up the interim communication path.

At this point in the process, the interim communication path has been completed. Neither originating gateway 44 nor terminating gateway 48 may be cut out, therefore the interim communication path becomes final communication path 186, and the process is complete.

Originating PSTN unit 34 is connected to the originating local PSTN (not shown), which, utilizing the PCM protocol, is linked to originating gateway 44 via final originating link 182. Final terminating link 174 utilizes the PCM protocol from terminating gateway 48 to the local PSTN (not shown), which is connected to terminating PSTN unit 38.

Figure 11:
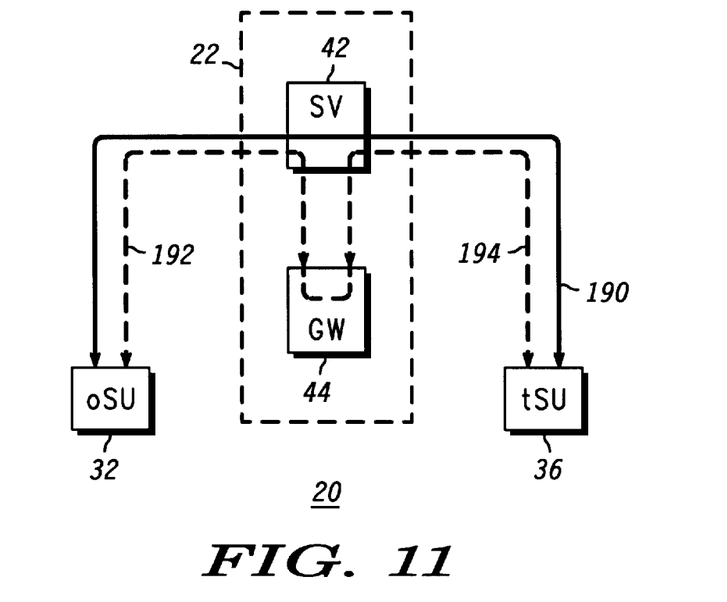
FIG. 11 shows a simplified block diagram demonstrating a communication path between subscriber units sharing a common gateway and utilizing a common protocol in accordance with a preferred embodiment of the present invention.
Figure 12:
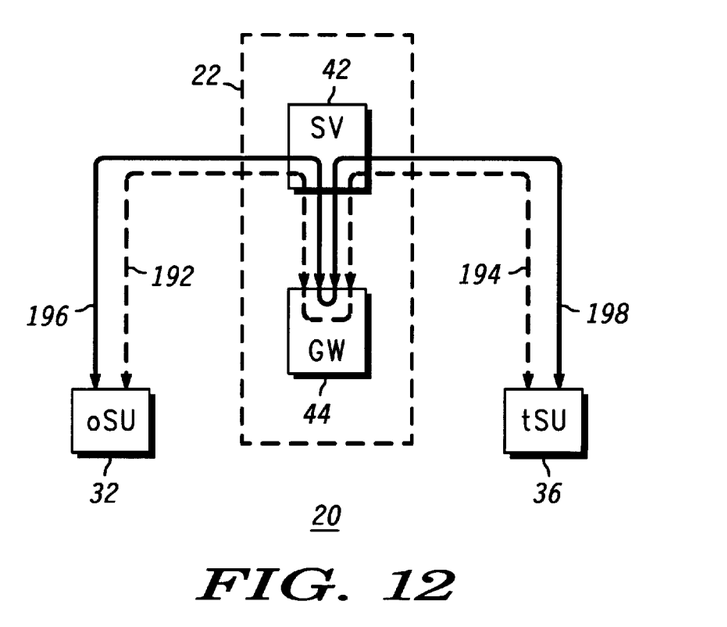
FIG. 12 shows a simplified block diagram demonstrating a communication path between subscriber units sharing a common gateway and not utilizing a common protocol in accordance with a preferred embodiment of the present invention.

As is described in conjunction with FIGS. 11 and 12, the call connection process also accommodates a series of special cases which occur when both the originating unit and the terminating unit are attached to the same gateway. In these cases, the gateway encompasses the functions of both an originating gateway and a terminating gateway. If both the originating and terminating subscriber units can communicate with the same satellite, this single gateway connects with a single satellite which could serve as both an originating satellite and a terminating satellite.

FIGS. 11 and 12 show simplified block diagrams of communication system 20 demonstrating interim communication paths and final communication paths between originating subscriber unit 32 and terminating subscriber unit 36 sharing a common gateway 40 in accordance with a preferred embodiment of the present invention. System links are demonstrated in FIG. 11 with a common protocol and in FIG. 12 without a common protocol.

Interim communication paths 192, 194 and final communication paths are established using the method of FIG. 4, except that, because only one gateway is used, tasks 106, 120, 126, 128, 132, 134, and 136 are bypassed.

If, as demonstrated in FIG. 11, originating gateway 44 found a common protocol, final communication path 190 contains a single link between originating subscriber unit 32 and terminating subscriber unit 36. This single link utilizes the common protocol from originating subscriber unit 32, through satellite 42, to terminating subscriber unit 36. Gateway 40 has been cut out and freed for other uses.

If, as demonstrated in FIG. 12, originating gateway 44 did not find a common protocol and protocol translation is performed in gateway 40, the final communication path contains two links 196, 198 between originating subscriber unit 32 and terminating subscriber unit 36. A final originating link 196 utilizes the originating protocol from originating subscriber unit 32, through satellite 42, to gateway 40. A final terminating link 198 utilizes the terminating protocol from gateway 40, through satellite 42, to terminating subscriber unit 36. Gateway 40 has not been cut out.

Figure 13:
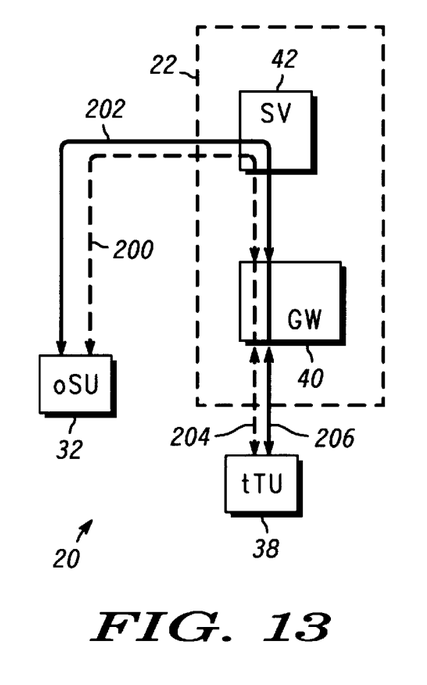
FIG. 13 shows a simplified block diagram demonstrating a communication path between an originating subscriber unit and a terminating PSTN unit sharing a common gateway in accordance with a preferred embodiment of the present invention.

FIG. 13 shows a simplified block diagram of communication system 20 demonstrating an interim communication path 200 and a final communication path 202 between originating subscriber unit 32 and terminating PSTN unit 38 sharing a common gateway 40 in accordance with a preferred embodiment of the present invention.

Interim communication path 200 and final communication path 202 are established using the method of FIG. 4, except that, because the terminating unit is a terminating PSTN unit 38 and only one gateway is used, tasks 106, 112, 114, 116, 118, 120, 122, 124, 126, 128, and 130 are bypassed.

In task 132, gateway 40 allocates resources and establishes two node-to-node links spanning the distance between originating subscriber unit 32 and terminating PSTN unit 38 with gateway 40 as the protocol translator. Originating node-to-node link 200, utilizing the originating protocol, is established from originating subscriber unit 32, through satellites (SV) 42, to gateway (GW) 40. A terminating node-to-node link 204, utilizing the PCM protocol, is established from gateway (GW) 40 to the local PSTN (not shown), which is connected to terminating PSTN unit 38. Both node-to-node links taken together make up interim communication path 200.

At this point, interim communication path 200 has been completed. Gateway 40 may not be cut out, therefore interim communication path 200 becomes final communication path 202, and the process is complete.

As demonstrated in FIG. 13, final communication path 202 contains two links between originating subscriber unit 32 and terminating PSTN unit 38. Final originating link 202 utilizes the originating protocol from originating subscriber unit 32, through satellite 42, to gateway 40. A final terminating link 206 utilizes the PCM protocol from gateway 40 to the local PSTN (not shown), which is connected to terminating PSTN unit 38.

Figure 14:
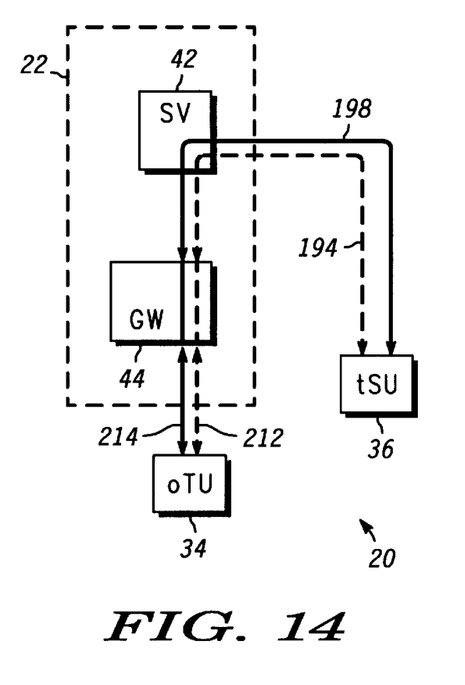
FIG. 14 shows a simplified block diagram demonstrating a communication path between an originating PSTN unit and a terminating subscriber unit sharing a common gateway in accordance with a preferred embodiment of the present invention.

FIG. 14 shows a simplified block diagram of communication system 20 demonstrating an interim communication path 208 and a final communication path 210 between an originating PSTN unit 34 and a terminating subscriber unit 36 sharing a common gateway 40 in accordance with a preferred embodiment of the present invention.

Interim communication path 200 and final communication path 202 are established using the method of FIG. 4, except that, because the originating unit is an originating PSTN unit 34 and only one gateway is used, tasks 104, 106, 114, 116, 118, 120, 122, 124, 126, 128, 132, 134, 136, 138, and 140 are bypassed.

In task 130, gateway 40 allocates resources and establishes two node-to-node links spanning the distance between originating PSTN unit 34 and terminating subscriber unit 36 with gateway 40 as the protocol translator. Originating PSTN unit 34 is connect to originating local PSTN (not shown), which is linked to gateway (GW) 40 via an originating node-to-node link 212 utilizing the PCM protocol. Terminating node-to-node link 194, utilizing the terminating protocol, is established from gateway 40, through satellite 42, to terminating subscriber unit 36. Both node-to-node links taken together make up the interim communication path.

At this point, interim communication path 194 has been completed. Gateway 40 may not be cut out. Therefore interim communication path 194 becomes final communication path 198, and the process is complete.

Originating PSTN unit 34 is connected to originating local PSTN (not shown), which is linked to gateway 40 via a final originating link 214 utilizing the PCM protocol.

Figure 15:
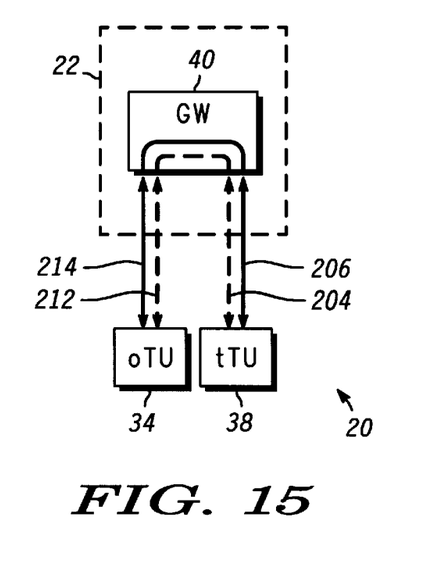
FIG. 15 shows a simplified block diagram demonstrating a communication path between PSTN units sharing a common gateway in accordance with a preferred embodiment of the present invention.

FIG. 15 shows a simplified block diagram of communication system 20 demonstrating an interim communication path 204, 212 and a final communication path 206, 214 between two PSTN units 34, 38 sharing a common gateway 40 in accordance with a preferred embodiment of the present invention.

Interim communication path 204, 212 and final communication path 206, 214 are established using the method of FIG. 4, except that, because the originating and terminating units are an originating PSTN unit 34 and a terminating PSTN unit 38 and only one gateway is used, tasks 104, 106, 112, 114, 116, 118, 120, 122, 124, 126, 128, 132, 134, 136, 138, and 140 are bypassed.

In task 130, gateway 40 allocates resources and establishes two node-to-node links spanning the distance between originating PSTN unit 34 and terminating PSTN unit 38 with gateway 40 as the protocol translator. Originating PSTN unit 34 is connected to originating local PSTN (not shown), which is linked to gateway 40 via originating node-to-node link 212 utilizing the PCM protocol. Terminating node-to-node link 204, also utilizing the PCM protocol, is established from gateway 40 to the local PSTN (not shown), which is connected to terminating PSTN unit 38. Both node-to-node links taken together make up the interim communication path.

At this point, the interim communication path has been completed. Gateway 40 may not be cut out. Therefore, the interim communication path becomes final communication path 204, 214, and the process is complete.

In summary, the use of user-prioritized protocol lists 62 stored within subscriber units 32, 34, 36, 38, intelligent transcoders 70, 71 within gateways 40, and the ability to cut out unrequired gateways, allows communication system 20 to operate in such a manner as to optimize system resources while simultaneously increasing efficiency and minimizing system overhead.

Although the preferred embodiments of the invention have been illustrated and described in detail, it will be readily apparent to those skilled in the art that various modifications may be made therein without departing from the spirit of the invention or from the scope of the appended claims. For example, in the description above, processing is described as being performed by originating gateway 44 and/or terminating gateway 48. Those of skill in the art will recognize that the processing described can also be performed by a network processor which includes the originating gateway, the terminating gateway, or combinations of one or more other nodes of the system.

What is claimed is:

1. A method of operating a communication network to provide communication between an originating unit and a terminating unit, said method comprising the steps of:

routing data identifying an originating protocol for said originating unit and a terminating protocol for said terminating unit to a network processor, wherein said network processor comprises an originating processor associated with said originating unit and residing in an originating network node, and a terminating processor associated with said terminating unit and residing in a terminating network node;

determining whether said originating protocol is substantially identical to said terminating protocol, and when said determining step determines that said originating protocol is substantially identical to said terminating protocol, said substantially identical protocols defining a common protocol, identifying said communication link as a first communication link, activating a second communication link between said originating unit and said terminating unit using said common protocol, and routing said second communication link to exclude one of said originating and terminating network nodes;

establishing, when said determining step determines that said originating protocol is not substantially identical to said terminating protocol, a communication link between said originating and terminating units using both of said originating and terminating protocols; and translating, when said determining step determines that said originating protocol is not substantially identical to said terminating protocol, between said originating and terminating protocols.

2. A method as claimed in claim 1 wherein said routing step routes a list of a plurality of protocols for one of said originating and terminating units.

3. A method as claimed in claim 2 wherein said routing step comprises the step of maintaining said protocol list in said one unit.

4. A method as claimed in claim 3 wherein said maintaining step comprises the step of prioritizing said protocol list to indicate a protocol preference of said one unit.

5. A method as claimed in claim 1 wherein said communication link is a first communication link, and wherein said method additionally comprises, when said determining step determines that said originating protocol is substantially identical to said terminating protocol, said substantially identical protocols defining a common protocol, the step of activating a second communication link between said originating and terminating units using said common protocol.

6. A method as claimed in claim 5 wherein:

said translating step is performed in at least a portion of said network processor;

said portion of said network processor resides in a network node; and said activating step comprises the step of routing said second communication link to exclude said network node.

7. A method as claimed in claim 5 wherein:

said originating protocol is one of a plurality of originating protocols;

said terminating protocol is one of a plurality of terminating protocols; and said originating protocol has priority over said terminating protocol.

8. A method as claimed in claim 1 additionally comprising, when said determining step determines that said originating protocol is not substantially identical to said terminating protocol, the step of ascertaining which of said originating and terminating protocols requires greater use of resources of said network.

9. A method as claimed in claim 8, wherein, when said ascertaining step ascertains that said originating protocol requires greater use of said network resources:

said translating step is performed in said originating network node; and said establishing step comprises the step of routing said communication link to exclude said terminating network node.

10. A method as claimed in claim 8, wherein, when said ascertaining step ascertains that said terminating protocol requires greater use of said network resources:

said translating step is performed in said terminating network node; and said establishing step comprises the step of routing said communication link to exclude said originating network node.

11. A method as claimed in claim 1 wherein:

said routing step comprises the step of receiving said originating protocol at said originating processor and said terminating protocol at said terminating processor;

said routing step additionally comprises the step of routing said received protocol from a first one of said receiving and terminating processors to a second one of said receiving and terminating processors; and said determining step is performed at said second processor, said determining step produces protocol selection results, and said determining step comprises the step of communicating said protocol selection results to said first processor.

12. A method of operating a communication network to provide communication between an originating unit which is configured to communicate using any one of a plurality of originating protocols and a terminating unit which is configured to communicate using any one of a plurality of terminating protocols, said method comprising the steps of:

a) receiving, at a network processor from said originating unit during a call setup process involving said originating and terminating units, a list identifying said originating protocols;

b) receiving, at said network processor from said terminating unit during said call setup process, a list identifying said terminating protocols;

c) determining whether a common protocol exists between said originating and terminating protocols;

d) establishing a first communication link between said originating and terminating units if said common protocol exists, said first communication link using said common protocol;

e) establishing a second communication link between said originating and terminating units if said common protocol does not exist, said second communication link using one of said originating protocols and one of said terminating protocols; and f) translating, at a network node if said common protocol does not exist, between said one originating protocol and said one terminating protocol.

13. A method as claimed in claim 12 wherein:

at least a portion of said network processor resides in said network node; and said establishing step d) comprises the step of routing said first communication link to exclude said network node.

14. A method as claimed in claim 12 wherein said network processor comprises:

an originating processor associated with said originating unit and residing in an originating network node; and a terminating processor associated with said terminating unit and residing in a terminating network node.

15. A method as claimed in claim 14 additionally comprising, if said determining step c) determines that said common protocol does not exist, the step of ascertaining which of one of said originating protocol and said terminating protocol requires greater use of resources of said network.

16. A method as claimed in claim 15 wherein, when said ascertaining step ascertains that said originating protocol and said terminating protocol requires equal use of said network resources, said originating protocol has priority over said terminating protocol.

17. A method as claimed in claim 15, wherein, when said ascertaining step ascertains that said originating protocol requires greater use of said network resources:

said translating step f) is performed in said originating network node; and said establishing step e) comprises the step of routing said second communication link to exclude said terminating network node.

18. A method as claimed in claim 15, wherein, when said ascertaining step ascertains that said terminating protocol requires greater use of said network resources:

said translating step f) is performed in said terminating network node; and said establishing step e) comprises the step of routing said communication link to exclude said originating network node.

19. A method as claimed in claim 14, wherein said establishing step d) comprises the step of routing said first communication link to exclude one of said originating and terminating network nodes.

* * * * *